(12) United States Patent
Nakasuga et al.

(10) Patent No.: US 7,414,002 B2
(45) Date of Patent: Aug. 19, 2008

(54) ALUMINUM OXIDE-TITANIUM NITRIDE SINTERED BODY, MANUFACTURING METHOD THEREOF, AND MAGNETIC HEAD SUBSTRATE, ULTRASONIC MOTOR AND DYNAMIC PRESSURE BEARING USING THE SAME

(75) Inventors: Minoru Nakasuga, Satsumasendai (JP); Kazuhide Kusano, Satsumasendai (JP)

(73) Assignee: Kyocera Corporation, Kyoto (JP)

( * ) Notice: Subject to any disclaimer, the term of this patent is extended or adjusted under 35 U.S.C. 154(b) by 125 days.

(21) Appl. No.: 11/289,801

(22) Filed: Nov. 29, 2005

(65) Prior Publication Data

US 2006/0115685 A1    Jun. 1, 2006

(30) Foreign Application Priority Data

Nov. 29, 2004    (JP) .............................. 2004-344213

(51) Int. Cl.
*C04B 35/117* (2006.01)
*C04B 35/58* (2006.01)
*G11B 5/127* (2006.01)

(52) U.S. Cl. ...................... 501/127; 501/105; 501/96.1; 428/813; 252/520.2; 252/520.22

(58) Field of Classification Search ................ 501/96.1, 501/127, 105; 252/520.2, 520.22; 428/813
See application file for complete search history.

(56) References Cited

U.S. PATENT DOCUMENTS

| 4,681,813 A | * | 7/1987 | Yamada et al. ............... 428/450 |
| 5,275,981 A | * | 1/1994 | Nishiyama et al. ............ 501/87 |
| 6,589,448 B2 | * | 7/2003 | Niwa et al. .................. 252/516 |

FOREIGN PATENT DOCUMENTS

| JP | 59-78973 | | 5/1984 |
| JP | 01-219059 | | 9/1989 |
| JP | 04-230904 | | 8/1992 |
| JP | 05-002730 | | 1/1993 |
| JP | 5-330905 | * | 12/1993 |
| JP | 06-028632 | | 2/1994 |
| JP | 2001-056919 | | 2/2001 |
| JP | 2003-018870 | | 1/2003 |

\* cited by examiner

*Primary Examiner*—Karl E Group
(74) *Attorney, Agent, or Firm*—Hogan & Hartson LLP

(57) ABSTRACT

The present invention provides an aluminum oxide-titanium nitride sintered body having good resistance to electrostatic damage and small variation in volume resistivity. The aluminum oxide-titanium nitride sintered body is mainly composed of 65 to 85% by weight of aluminum oxide and titanium nitride constituting the rest. The average of the sum of the crystal grain sizes of the aluminum oxide and the titanium nitride is 0.4 to 2.0 µm. The aluminum oxide has a mean crystal grain size of 0.5 to 2.2 µm and the titanium nitride has a mean crystal grain size of 0.2 to 1.6 µm.

8 Claims, 6 Drawing Sheets

ALUMINUM OXIDE-TITANIUM NITRIDE SINTERED BODY, MANUFACTURING METHOD THEREOF, AND MAGNETIC HEAD SUBSTRATE, ULTRASONIC MOTOR AND DYNAMIC PRESSURE BEARING USING THE SAME

Priority is claimed to Japanese Patent Application No. 2004-344213 filed on Nov. 29, 2004, the disclosure of which is incorporated by reference in its entirety.

BACKGROUND OF THE INVENTION

1. Field of the Invention

The present invention relates to an aluminum oxide-titanium nitride sintered body, a manufacturing method thereof, and magnetic head substrates for hard disk drive (hereinafter, referred to as HDD), ultrasonic motors and dynamic pressure bearings using the same.

2. Description of Related Art

Conventionally, composite ceramics consisting of a combination of aluminum oxide and various metal or non-metal carbides, nitrides or the like has been proposed. For example, materials consisting of a combination of aluminum oxide and titanium carbide, or aluminum oxide and titanium nitride have been used for wear resistant members or slide members due to large hardness, and also used for antistatic members due to conductivity.

Specific applications of the above-mentioned include a magnetic head substrate for HDD. FIG. 5(a) is a perspective view showing a general substrate for a magnetic head and FIG. 5(b) is a perspective view showing a magnetic head. As shown in FIG. 5(a), a magnetic head substrate 50 for HDD consists of a composite ceramics mainly composed of aluminum oxide and titanium carbide or aluminum oxide and titanium nitride. Through film forming processes, a number of magnetic head elements 51 are formed on the surface of the magnetic head substrate 50. Subsequently, through individual cutting in slicing process, a magnetic head shown in FIG. 5(b) is obtained.

Since a magnetic head slider 20 that slides on a recording disk (not shown in the drawings) is formed in the magnetic head 52, the magnetic head substrate 50 needs high resistance to wear. Conductivity is also needed to prevent electrostatic damage to the magnetic head element 51. Furthermore, since the magnetic head slider 20 generally flies about several nm high from a recording disk, it is important to highly precisely process a flying surface 20a through ion milling etc. In FIG. 5(b), 20b represents a groove (rail). However, the rail is not limited to groove-like shape and can be convex.

Another application is the pressure member of an ultrasonic motor or the contact surface of a movable member. An ultrasonic motor is a friction drive motor whose drive source is the vibration of piezoelectric elements. Unlike general magnetic drive motors, an ultrasonic motor is not influenced by magnetism and has a high-resolution positioning capability, small size and large driving force, and therefore it is used in zoom mechanism for cameras and magnetic resonance imaging system for medical use. Since the ultrasonic motor is friction-driven, ceramics excellent in resistance to wear and heat has been used as a material for a pressure member which transfers driving force or a contact surface.

FIG. 6 shows an example of an ultrasonic motor. FIG. 6(a) is a schematic illustration showing one principal surface of a general ultrasonic motor and FIG. 6(b) is a schematic illustration showing the other principal surface. As shown in FIG. 6(a), an ultrasonic motor 60 has four divided electrode films 60b on one principal surface of a piezoelectric ceramic plate 60c with wires connected cater-cornered. As shown in FIG. 6(b), an electrode film 60d is formed throughout the other principal surface, thereby preparing a vibrating body 60e. By applying voltages having different phases to the electrode films 60b and 60d, longitudinal vibration and lateral vibration are generated in the piezoelectric ceramic plate 60c. The combination of these vibrations generates elliptic motion in the pressure member 60a. The elliptic motion in the pressure member 60a is transferred to the contact surface of a movable member so as to move the movable member.

For example, an ultrasonic motor is used for guide apparatus. FIG. 7 is a schematic illustration showing guide apparatus in which the ultrasonic motor shown in FIG. 6 is employed. As shown in FIG. 7, guide apparatus 70 has such a structure that a stage 72 is provided on guide members 71 and that the ultrasonic motor 60 is disposed on the contact surface 72a which is the side surface of the stage 72. The ultrasonic motor 60 transfers driving force from the pressure member 60a to the contact surface 72a, thereby moving the stage 72 from side to side.

Such composite ceramics containing aluminum oxide and titanium nitride as used for the above-mentioned applications has been disclosed, for example, in Patent documents 1 to 4. Some conventional materials for magnetic head substrates have been described in Patent documents 5 and 6. In addition, composite ceramics used for the pressure part of an ultrasonic motor has been described in Patent document 7.

Patent document 1 discloses anti-static ceramics which contains one or more of conductive compounds selected from nitrides and carbides of Ti, Zr, Hf, Nb or Ta in a matrix mainly composed of aluminum oxide, and whose surface resistivity is in the range of $10^6$ to $10^{10}$ Ω·cm$^2$. It is disclosed that 4 to 23% by volume of conductive compounds are contained and aluminum oxide substantially constitutes the rest, having a mean grain size of not more than 5 μm. In the field of industrial application, the ceramics is proposed as anti-static ceramics for electronic parts to prevent damages caused by rapid discharge when handling charged electronic parts.

Patent document 2 discloses a magnetic head slider wherein one or more selected from SiC, ZrC, TaC, TiC, NbC or TiN are contained in a composite sintered body of $Al_2O_3$-10 mole % MgO, $Al_2O_3$ 10 mole % $SiO_2$, MgO-2.5 mole % $Nb_2O_5$, $Al_2O_3$-5 mole % $Nb_2O_5$ and $Al_2O_3$-10 mole % $TiO_2$, or any oxide of $Nb_2O_5$. It discloses that the magnetic head slider can inhibit the wear of a protection film containing carbon or mainly containing carbon in a magnetic disk. That means, since a protection film containing carbon or mainly containing carbon wears off due to the oxidation of the carbon, it is proposed that the magnetic head slider is formed by using materials whose catalysis is small in accelerating the oxidation of the carbon.

Patent document 3 discloses a substrate for manufacturing a thin-film magnetic head wherein a main component consists of $Al_2O_3$, $TiO_2$ or $Y_2O_3$, stabilizing $ZrO_2$ and wherein the main component contains 2 to 10% by weight of Er in terms of $Er_2O_3$. It also discloses a substrate for manufacturing a thin-film magnetic head, wherein the above main component contains not more than 40% by weight of any one or more selected from SiC, ZrC, NbC, TaC, TiC or TiN. In the substrate for manufacturing a thin-film magnetic head, 2 to 10% by weight of $Er_2O_3$ is added to the main component. The reason for this is not clear, but as well as the effect of inhibiting the wear of a protection film containing carbon or mainly containing carbon in Patent document 2, a decrease in chipping during machining process or voids during surface polishing is disclosed.

Patent document 4 discloses conductive ceramics obtained by sintering a composition which consists of a mixture of 5 to 70 parts by weight of $Al_2O_3$ ceramics containing $Al_2O_3$ only or containing not less than 95% by weight of $Al_2O_3$ and as conductive material, 30 to 95 parts by weight of at least one or more selected from $ZrB_2$, ZrC, ZrN, $TaB_2$, TaC, TaN, $TiB_2$, TiC and TiN. It also discloses that the since conductive ceramics have a plus figure in resistance temperature characteristic, it does not cause meltdown by a flush of electric current when applying current and heating and it is suitable for heaters or electric igniters.

Patent document 5 discloses a ceramic sintered body (hereinafter, referred to as AlTiC) wherein a main component consists of 60 to 80% by weight of aluminum oxide and 20 to 40% by weight of titanium carbide and the main component contains zirconium oxide, magnesium oxide, yttrium oxide and calcium oxide. It discloses that the ceramic sintered body has better resistance to chipping during slicing process and that it is a magnetic head substrate having low resistance to cutting during machining process.

Patent document 6 discloses a magnetic head substrate that is composed of a sintered body having not less than 99% by weight of silicon carbide, not more than 0.3% by weight of free carbon content and a relative density of not less than 99%. It also discloses that the magnetic head substrate has a heat conductivity of not less than 100 W/m·K, a Young's modulus of not less than 400 GPa, a mean crystal grain size of not more than 10.0 µm and a volume resistivity of $10^6$ to $10^9$ Ω·cm. It discloses that the magnetic head substrate made of silicon carbide has better heat radiating property while maintaining mechanical strength and milling property equivalent to the magnetic head substrate made of AlTiC disclosed in Patent document 5;

Patent document 7 discloses an ultrasonic motor which comprises a vibrating body and a pressure member to transfer the vibration of the vibrating body to a movable member and wherein the pressure member is composed of a composite material of aluminum oxide and titanium carbide. It discloses that the pressure member composed of this composite material makes it possible to inhibit the wear of the pressure member and stabilize the condition of contact. It further discloses that titanium carbide reacts with oxygen in the atmosphere by frictional heat during sliding and turns into titanium oxide having larger coefficient of friction than aluminum oxide or titanium carbide, making it possible to lessen the slip between the pressure member and the movable member side and to transfer driving force without loss.

[Patent document 1] Japanese Unexamined Patent Publication No. 4-230904

[Patent document 2] Japanese Unexamined Patent Publication No. 5-2730

[Patent document 3] Japanese Unexamined Patent Publication No. 6-28632

[Patent document 4] Japanese Unexamined Patent Publication No. 59-78973

[Patent document 5] Japanese Unexamined Patent Publication No. 1-219059

[Patent document 6] Japanese Unexamined Patent Publication No. 2001-56919

[Patent document 7] Japanese Unexamined Patent Publication No. 2003-18870

SUMMARY OF THE INVENTION

However, the anti-static ceramics for electronic parts disclosed in Patent document 1 has a mean crystal grain size of not more than 5 µm, and a relatively large crystal grain size for magnetic head substrate material is recited in the claims. Therefore, there have been the following problems.

First, when measuring how high an HDD magnetic head slider cut away from a magnetic head substrate flies from a magnetic disk (see FIG. 2), a laser having a spot diameter of about 4 to 6 µm is used. Therefore, when a mean crystal grain size is not less than 5 µm, the refraction, reflection and angle of the irradiated laser beam vary from place to place (from crystal to crystal), leading to a problem of inaccurate measurement (see FIG. 3).

FIG. 2 is a schematic diagram showing how the flying height of a magnetic head slider is measured. A magnetic head slider 20 flies at the height of B over a rotating disk 21 made of transparent glass or sapphire, which is equivalent to a magnetic disk. An incoming laser beam 22 is irradiated from below to the flying surface 20a of the magnetic head slider 20, and a reflecting laser beam 23 enters a measurement part 24. In FIG. 2, the numbers 25 and 26 respectively represent a laser beam transmitter to transmit laser beams and an arm to support a magnetic head and a slider.

FIG. 3 is an enlarged schematic diagram showing the vicinity of the laser irradiating part on the flying surface 20a of the magnetic head slider 20. When the magnetic head slider has too large crystal grain size, it can be predicted that refraction, reflection and angle vary, depending on the position of a laser spot 30, that is, a crystal phase 11, a crystal phase 12 and the boundary portion between the crystal phases 11 and 12.

Second, the magnetic head slider has grooves 20b etc. formed on the flying surface 20a through ion milling, and has a function of adjusting the flying height. However, the ion milling processing rate varies, depending on the type of crystals. When a mean crystal grain size is large, there has been a problem that because of the gap among the neighboring crystal grains, the flying surface 20a has lower form accuracy and less stable flying characteristic. Specifically, the gap of the grooves 20b etc. on the flying surface 20a formed in the magnetic head slider is normally about 0.1 to several µm. With a material having a mean crystal grain size of not less than 5 µm, it has been difficult to control processing error.

FIGS. 4(a) and (b) are schematic illustrations showing the relations of crystal phase, crystal grain size and processing rate on the surface of the magnetic head slider 20 of FIG. 2. In FIGS. 4(a) and (b), the number 43 indicates the surface before processing, and the numbers 41 and 42 respectively indicates crystal phases. In FIG. 4(a), since crystal grain size is larger, the gap A in processing rate is observed as large hollows in a wider area. Meanwhile, in FIG. 4(b), even if the composition is the same, crystal grain size is smaller. Therefore, it is apparent that the gap A in processing rate is evenly distributed as a whole, making it possible to process the flying surface 20a with high accuracy.

Furthermore, when using the anti-static ceramics as a magnetic head substrate material, due to its surface resistivity of $10^6$ to $10^{10}$ Ω·$cm^2$, there has been a problem of less conductivity, compared to aluminum oxide-titanium carbide which is the mainstream as a magnetic head substrate material at present and which has a surface resistivity of not more than $10^{-1}$ Ω·$cm^2$.

In the magnetic head slider material disclosed in Patent document 2, carbide and nitride are added to a composite sintered body of oxide ceramics. Patent document 2 discloses that a double oxide is produced between two oxides, and it is supposed to be a glass phase. However, when an oxide crystal phase, a glass phase, a carbide crystal phase and a nitride crystal phase are mixed, as mentioned earlier, ion milling processing rate varies. When using such a material for a magnetic head slider, the problem has been that it is difficult to form grooves on the flying surface or the like with high accuracy. In other words, because this material has at least not less than three crystal phases (including a glass phase), at least three gaps are produced on the flying surface under one milling condition, leading to lower accuracy in processing.

Normally, such a glass phase is susceptible to wear and corrosion and deteriorates the durability of a magnetic head slider. Moreover, there has been a serious problem that wear dust coming from a glass phase lowers the cleanliness in a magnetic disk device.

Patent document 3 discloses an oxide-carbide-type or oxide-nitride-type substrate for manufacturing a magnetic head, which has better machinability. However, because the substrate contains 2 to 10% by weight of erbium oxide, it has not solved such problems as in Patent documents 1 and 2.

Patent document 4 discloses conductive ceramics which comprises $Al_2O_3$ ceramics containing aluminum oxide only or not less than 95% by weight of aluminum oxide, and at least one or more of borides, carbides and nitrides. This material is not devised for a magnetic head substrate, and therefore has not solved the problem with crystal grain size in Patent document 1.

In Example 10 of Patent document 4, by blending and hot-pressing aluminum oxide having a mean grain size of 0.5 μm and titanium nitride having a mean grain size of 2 μm, an aluminum oxide-titanium nitride composite material is prepared. However, it is easily predicted that after hot-pressing, the mean grain size of titanium nitride turns not less than 2 μm. Obviously the material is not suitable for a magnetic head substrate.

In addition, when $Al_2O_3$ ceramics containing not less than 95% by weight of aluminum oxide is used, since sintering additive forms a glass phase, the problem in Patent document 2 that the durability of the magnetic head slider deteriorates and wear dust occurs has been outstanding.

Patent document 5 discloses that aluminum oxide-titanium carbide ceramics is used as a magnetic head substrate. However, AlTiC which is the mainstream as a magnetic head substrate for HDD has a low volume resistivity of not more than $10^{-3}$. Therefore, when the surroundings are electrically charged, rapid discharge is apt to occur toward a magnetic head element, and there has been a risk that a magnetic head element will incur electrostatic damage.

Patent document 6 discloses a magnetic head substrate made of silicon carbide, which has high heat conductivity and good heat radiating property. However, silicon carbide normally has a high Vickers hardness of not less than 20 GPa, resulting in very poor machinability. The problem has been that while magnetic head elements are cut away in slicing process, chipping occurs and tools quickly suffer wear damage. Another problem has been that when amorphous alumina film is formed as insulator film on a magnetic head substrate, because of the difference in coefficient of thermal expansion, peeling occurs as a result of temperature changes.

As above, conventional aluminum oxide-titanium nitride materials have not been satisfactory as a magnetic head substrate. Moreover, the above-mentioned other materials have had problems as a magnetic head substrate.

Regarding Patent document 7, when the pressure member of an ultrasonic motor is formed with composite ceramics of aluminum oxide and titanium carbide, titanium carbide reacts with oxygen in the atmosphere by frictional heat during sliding and turns into titanium oxide, producing the effect of increasing the coefficient of friction and preventing slip. On the other hand, there has been a problem that degradation in hardness and strength reduces wear resistance and shortens the lifetime of a motor.

To solve these problems, the present invention provides an aluminum oxide-titanium nitride sintered body mainly composed of 65 to 85% by weight of aluminum oxide and titanium nitride constituting the rest, wherein the average of the sum of the crystal grain sizes (hereinafter, referred to as total mean crystal grain size) of the aluminum oxide and the titanium nitride is 0.4 to 2.0 μm, the aluminum oxide has a mean crystal grain size of 0.5 to 2.2 μm, and the titanium nitride has a mean crystal grain size of 0.2 to 1.6 μm.

The aluminum oxide-titanium nitride sintered body of the present invention can inhibit deterioration in surface roughness caused by ion milling process etc., and maintain mirror finishing property. The grooves 20b and the like can be processed with high accuracy on the flying surface 20a shown in FIG. 5(b). Furthermore, when used for a magnetic head slider, the flying height from a magnetic disk can be precisely measured with a laser.

Since the aluminum oxide has a mean crystal grain size of 0.5 to 2.2 μm and the titanium nitride has a mean crystal grain size of 0.2 to 1.6 μm, a total mean crystal grain size of 0.4 to 2.0 μm and a material strength of not less than 600 MPa can be attained. Also, since the aluminum oxide is 65 to 85% by weight and the titanium nitride constitutes the rest, volume resistivity can be $10^{-3}$ Ω·cm or more to less than $10^6$ Ω·cm. The aluminum oxide-titanium nitride sintered body of the present invention can be suitably used for magnetic head substrates, ultrasonic motors and dynamic pressure bearings.

BRIEF DESCRIPTION OF THE DRAWINGS

FIG. 4(a) shows the case with larger grain size.

DESCRIPTION OF PREFERRED EMBODIMENTS

[Aluminum Oxide-titanium Nitride Sintered Body]

The aluminum oxide-titanium nitride sintered body of the present invention is mainly composed of 65 to 85% by weight of aluminum oxide and titanium nitride constituting the rest. The mean crystal grain size which is obtained by averaging the sum of the crystal grain sizes of the aluminum oxide and the titanium nitride, that is, the total mean crystal grain size is 0.4 to 2.0 μm, the aluminum oxide has a mean crystal grain size of 0.5 to 2.2 µm, and the titanium nitride has a mean crystal grain size of 0.2 to 1.6 µm.

The aluminum oxide according to the present invention is general α-type. On the other hand, titanium nitride is an invasive solid solution and therefore does not follow the general rules of bonding. In some cases, carbon, oxygen and others go into solid solution during powder producing process. For this reason, in the titanium nitride according to the present invention, the amount of solid solution of nitrogen is not less than 80 parts by weight when the total amount of solid solutions of nitrogen, carbon, oxygen and others is taken as 100 parts by weight.

The reason why aluminum oxide is used for the sintered body of the present invention is that aluminum oxide is inexpensive and that it is easier to obtain highly pure raw materials. The reason for the use of titanium nitride is that it has conductivity and thereby can prevent the sintered body from being charged with static electricity. In addition, when sintered as a composite material with aluminum oxide, titanium nitride has higher heat conductivity than AlTiC, a conventional material for magnetic head substrates, and has better resistance to oxidation than titanium carbide. Furthermore, although it depends on manufacturing methods, titanium carbide powder has an oxidizing temperature of about 400° C. while titanium nitride has an oxidizing temperature of about 500° C. Compared to AlTiC, when used as a slide member, it is possible to inhibit the surface oxidation of the sintered body caused by chemomechanical reaction.

Figure 1:
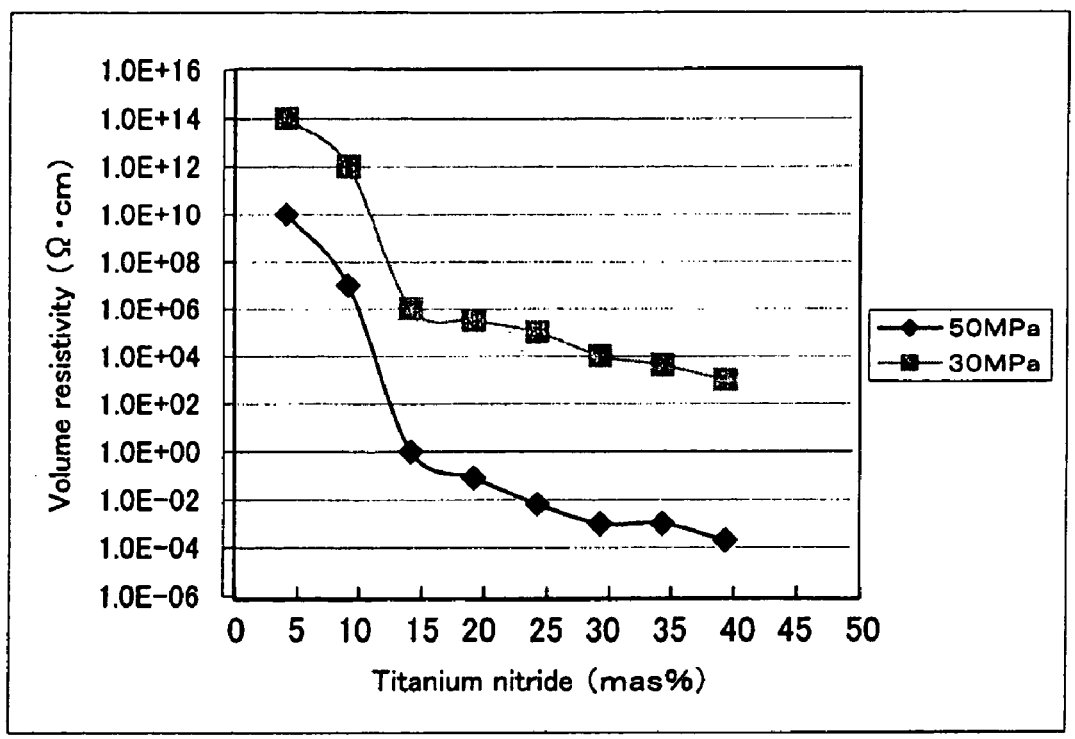
FIG. 1 is a graph showing the relation of the percentage of titanium nitride and the volume resistivity in the present invention.

The reason for the composition of 65 to 85% by weight of aluminum oxide and titanium nitride constituting the rest is to keep both material strength and proper conductivity. By contrast, when aluminum oxide is less than 65% by weight, the amount of titanium nitride is too large, thereby significantly lowering sinterability, strength of a sintered body and void level. At the same time, such problems arise as lower processability and more chipping in slicing process. When aluminum oxide is over 85% by weight, the amount of titanium nitride is too small, thereby lowering hardness and wear resistance. Moreover, it becomes difficult to keep conductivity, and as shown in FIG. 1, volume resistivity rapidly goes up. This is not preferable in terms of removing static electricity.

The probable reason why volume resistivity is stable in this range is that titanium nitride grains having conductivity are bonded almost evenly throughout the sintered body and in a stable condition.

The content of aluminum oxide is preferably 70 to 82% by weight. In this range, volume resistivity is stable and strength is sufficient, thereby making it possible to obtain a sintered body stable in quality during actual manufacturing process.

The total mean crystal grain size is not less than 0.4 µm. In order to prepare a sintered body having a total mean crystal grain size of less than 0.4 µm, crystal grains need to be ground to about 0.1 to 0.2 µm before sintering, and there are few advantages in consideration of cost and time. In addition, firing is performed for a short period of time to inhibit grain growth, thereby leading to insufficient sintering, residual voids and lower strength. Surface roughness after milling process also is worsened.

The total mean crystal grain size is not more than 2.0 µm. This is because the mirror finishing property of a member is kept good and the difference in processing rate among crystal phases by ion milling and etching is evenly distributed on the whole. For example, if the total mean crystal grain size is not more than 2.0 µm when used as a magnetic head substrate, since a laser beam used for measuring the flying height of a magnetic head as above has a spot diameter of about 4 to 6 µm, even if a laser beam is irradiated anywhere on the flying surface, a plurality of crystal phases are always included in the spot, thereby producing the effect of obtaining stable measurement conditions.

On the other hand, the total mean crystal grain size is over 2.0 µm when primary raw materials have large grain size or when firing temperature is too high. In this case, there are such problems as lowering material strength, mirror finishing property and ion milling property.

The total mean crystal grain size in the present invention is desirably in the range of 0.5 to 1.4 µm.

Aluminum oxide has a mean crystal grain size of 0.5 to 2.2 µm, and titanium nitride has a mean crystal grain size of 0.2 to 1.6 µm. When the grinding grain size of raw materials and the firing temperature are set so as to achieve this range, it is possible to obtain a material which maintains material strength and proper conductivity and which is excellent in mirror finishing property and ion milling property.

By contrast, when aluminum oxide has a mean crystal grain size of less than 0.5 µm, aluminum oxide and titanium nitride are insufficiently bonded in sintering process, lowering material strength. Conversely, when aluminum oxide has a mean crystal grain size of over 2.2 µm, much abnormal grain growth occurs in aluminum oxide crystals, which becomes a cause for lowering strength, and mirror finishing property is degraded as well.

When titanium nitride has a mean crystal grain size of less than 0.2 µm, in spite of grinding raw materials for a long period of time, there is no advantage seen in terms of material characteristics and only a small advantage in terms of cost. Conversely, when titanium nitride has a mean crystal grain size of over 1.6 µm, firing temperature is higher, and therefore aluminum oxide crystal grains are apt to bring about abnormal grain growth and cause a member to have lower strength. Even if abnormal grain growth is inhibited by firing at a lower temperature, there are voids remaining on the grain boundary between titanium nitride and aluminum oxide, thereby lowering strength. Furthermore, as titanium nitride has large crystal grains, the pathway for conducting static electricity is apt to be cut, thereby making the variation in conductivity of a sintered body large and the quality unstable.

Particularly, in the present invention, titanium nitride has smaller mean crystal grain size than aluminum oxide. That means it is preferable that the mean crystal grain size of aluminum oxide is larger than that of titanium nitride. Since titanium nitride has difficulties in sintering, when the mean crystal grain size of titanium nitride is larger than that of aluminum oxide, it becomes easier to form voids on the grain boundary with aluminum oxide crystals, which becomes a cause for lowering strength. Also, when a sintered body is subjected to grinding or mirror finishing, grain dropping and chipping are apt to occur and surface property is deteriorated, which becomes a cause for lowering strength as well.

Specifically, the mean crystal grain size of titanium nitride is preferably in the range of 20 to 95% to the mean crystal grain size of aluminum oxide. When the mean crystal grain size of titanium nitride is less than 20% to the mean crystal grain size of aluminum oxide, titanium nitride easily aggregates and the conducting pathway of a sintered body is insufficiently formed, making volume resistivity large. Even when aggregation does not occur, in sintering process, alumina prevents the conducting pathway from being formed. When the mean crystal grain size of titanium nitride is over 95%, because of its difficulties in sintering, titanium nitride having larger mean crystal grain size than aluminum oxide makes it easier to form voids on the grain boundary with aluminum oxide crystals, which becomes a cause for lowering strength. Also, when a sintered body is subjected to grinding and mirror finishing, grain dropping and chipping are apt to occur and surface property is deteriorated, which becomes a cause for lowering strength as well.

In order to keep the total mean crystal grain size within the range of the present invention, aluminum oxide and titanium nitride can be respectively ground so as to attain the following grain size: aluminum oxide: D50=0.1 to 1.8; titanium nitride: D50=0.1 to 1.4. The type and added amount of a sintering additive can be properly adjusted. Firing temperature is 1530 to 1780° C. and a hot press or a vacuum furnace (argon atmosphere, nitrogen atmosphere) can be used as firing equipment. The above-mentioned D50 stands for median size.

The total mean crystal grain size can be measured by taking a photograph of the mirror finished surface of a sintered body at a magnification of 1000 to 5000 with a scanning electron microscope (hereinafter, referred to as SEM), drawing straight lines at arbitrarily selected points in the photograph, and using code method. Before using an SEM, firing and etching can be carried out at a temperature which is 50 to 200° C. lower than firing temperature, thereby making it easy to observe grain boundary. The mean crystal grain sizes of aluminum oxide and titanium nitride can be measured in the same manner as the above method for measuring the total mean crystal grain size.

In the present invention, preferably, to 100 parts by weight of aluminum oxide and titanium nitride which constitute a main component, 0.005 to 1 parts by weight of at least one selected from ytterbium oxide and yttrium oxide is contained. The ytterbium oxide and the yttrium oxide are sintering additives. When such a sintering additive is contained in a specified quantity, it is possible to improve the sinterability of aluminum oxide and titanium nitride. Moreover, since the sintered body obtained through sintering with a specified quantity of the above sintering additive has a very small amount of glass phase component in the grain boundary, it is possible to obtain an aluminum oxide-titanium nitride sintered body which has good mirror finishing property, no significant deterioration in surface roughness even after ion milling, and high accuracy in milling process. In particular, the sintered body can be suitably used for a magnetic head slider, and it also has advantages such as less chipping in the cut surface during slicing process and fewer particles to be generated.

On the other hand, the above content of less than 0.005 parts by weight leads to the problem of no improvement in sinterability. The content of over 1 part by weight causes ytterbium oxide and yttrium oxide to aggregate, resulting in irregularity. There arises the problem that it is impossible to accurately measure the flying height of a magnetic head by using light reflectivity as mentioned above. In addition, when forming a translucent thin film on the surface of the sintered body and measuring the thickness with light, the problem is that reflectivity partially varies, making it impossible to measure accurately. There is also the problem that aggregate grains turn projections on the ion milling surface. Such a sintered body is not preferable for a magnetic head substrate.

In the present invention, it is preferable that 0.01 to 0.5 parts by weight of at least one selected from ytterbium oxide and yttrium oxide is contained. In this range, with a small amount of sintering additive, sinterability can be improved and no aggregate grains are generated, leading to good strength.

When adding at least one selected from ytterbium oxide and yttrium oxide as a sintering additive, the use of a hot press is preferable to make a sintered body denser. With a very small amount of sintering additive, even the use of a vacuum furnace does not allow sintering to go on. Instead of using a hot press, hot isostatic pressing (hereinafter, referred to as HIP) can be employed.

Moreover, in the present invention, to 100 parts by weight of aluminum oxide and titanium nitride which constitute a main component, 5 to 20 parts by weight, preferably, 8 to 15 parts by weight of at least two selected from ytterbium oxide, yttrium oxide, magnesium oxide, zirconium oxide, titanium oxide, silicon oxide and calcium oxide can be contained in total as a sintering additive.

A very small amount of ytterbium oxide and yttrium oxide improve the sinterability of aluminum oxide and titanium nitride. Magnesium oxide has the effect of inhibiting the grain growth of the main component. Zirconium oxide improves the processability of a sintered body. Titanium oxide makes a sintered body denser. Silicon oxide forms a glass phase and lowers sintering temperature. Calcium oxide has the effect of stabilizing a grain boundary phase.

When containing 5 to 20 parts by weight of such sintering additive in total, without using a hot press, HIP and other expensive equipment, even firing with an ordinary vacuum furnace (atmospheric furnace) makes it possible to obtain enough strength and hardness, and a dense aluminum oxide-titanium nitride sintered body can be obtained. There is no problem with firing by using a hot press, either. After firing with an ordinary vacuum furnace, HIP can be employed to attain high density and improve material characteristics such as strength and hardness. By contrast, when containing less than 5 parts by weight of such sintering additive, the effect of improving sinterability is small. It is not preferable to contain over 20 parts by weight of such sintering additive, because strength and wear resistance is deteriorated.

In the present invention, the volume resistivity is preferably $10^{-3}$ Ω·cm or more to less than $10^6$ Ω·cm. By keeping the volume resistivity of the sintered body of the present invention within the above range, it is possible to prevent a member from being charged with static electricity. For example, when used for a magnetic head substrate, the sintered body can have resistance to electrostatic damage, which is equal to or more than that of AlTiC material (volume resistivity: about $10^{-3}$ Ω·cm), the mainstream as a magnetic head substrate for HDD. Thereby, without additional antistatic measures in conventional production line, the sintered body of the present invention can be used as a magnetic head substrate for HDD, and suitably used for electronic parts peripheral jigs such as a magnetic head element having the problem of electrostatic damage.

Meanwhile, when the volume resistivity is less than $10^{-3}$ Ω·cm, as shown in FIG. 1, over 35% by weight of titanium nitride is added, lowering sinterability, void level and processability as mentioned above. When the volume resistivity is not less than $10^6$ Ω·cm, especially in case of the use as a magnetic head substrate material, conductivity turns lower, which requires such additional measures as adding antistatic films to a member. This leads to an increase in the number of processes, which is not preferable in terms of cost.

Particularly, from the viewpoint of resistance to electrostatic damage, it is preferable that the volume resistivity is in the range of not less than $10^{-3}$ Ω·cm and not more than $10^4$ Ω·cm.

In order to keep the volume resistivity within the range of the present invention, the sintered body can have the total mean crystal grain size of 0.4 to 2.0 μm, and be composed of 65 to 85% by weight of aluminum oxide and titanium nitride constituting the rest. Specifically, as more titanium nitride is contained and the total mean crystal grain size is smaller, the volume resistivity becomes smaller. Since titanium nitride has conductivity, the more its content is, the lower the volume resistivity of the sintered body is. When the total mean crystal grain size is small, titanium nitride is apt to form a three-dimensional network structure among insulating aluminum oxide crystal grains, resulting in a decrease in the volume resistivity.

For measuring volume resistivity, in case of low resistance of less than $10^6$ Ω·cm, four-point probe method based on JIS K 7194 can be employed while in case of high resistance of not less than $10^6$ Ω·cm, double ring method based on JIS K 6911 can be employed.

The sintered body of the present invention preferably has higher heat conductivity than 23 W/m·K. This makes it possible to more quickly radiate the heat generated from magnetic head elements than AlTiC. For example, conventional AlTiC obtained by blending 70% by weight of aluminum oxide and 30% by weight of titanium carbide and sintering at 1750° C. for one hour with a hot press has a heat conductivity of not more than 23 W/(m·K). By contrast, the sintered body of the present invention which is obtained by blending 70% by weight of aluminum oxide and 30% by weight of titanium nitride and sintering under the equal conditions has a heat conductivity of 24 to 27 W/m·K, a higher heat conductivity than that of AlTiC. This is because titanium nitride has higher heat conductivity than titanium carbide. As shown in Table 4 of Example 3, with the composition range of the present invention, it is possible to raise heat conductivity up to 30 W/(m·K).

Heat conductivity is adjusted, for example, through adjusting the mass ratio of aluminum oxide and titanium nitride, or adjusting crystal grain size. Heat conductivity can be made large by raising the ratio of aluminum oxide, increasing crystal grain size, or carrying out the both. Aluminum oxide has higher heat conductivity than titanium nitride, and in case of larger crystal grain size, grain boundary which prevents heat conduction diminishes. In addition, heat conductivity can be adjusted through adjusting a sintering additive.

With higher heat conductivity than AlTiC, for example, when used for a magnetic head substrate, the sintered body of the present invention quickly radiates the heat generated from a magnetic head element, and achieves the effect of preventing heat-induced errors or overheat. When used for a slide member, the sintered body of the present invention radiates the heat generated on a slide surface to the surroundings as well and achieves the effect of preventing the temperature rise of a member and the change in dimension caused by thermal expansion. The heat conductivity can be measured through laser flash method based on JIS C 2141.

The sintered body of the present invention preferably has a thermal expansion coefficient of 7.2 to 7.8 ppm/° C. This makes it possible to prevent peeling and cracks caused by the difference in thermal expansion coefficient, when amorphous alumina film is formed on the sintered body. For example, when used for a magnetic head substrate, by forming amorphous alumina film as insulator film on a magnetic head substrate, it is possible to attain a material having good adhesion and use the same manufacturing equipment employed to manufacture conventional AlTiC.

To attain a thermal expansion coefficient of 7.2 to 7.8 ppm/° C., the mass ratio of aluminum oxide, titanium nitride and a sintering additive can be adjusted within the range of the present invention. Specifically, as the mass ratio of aluminum oxide increases, the thermal expansion coefficient becomes large. The thermal expansion coefficient can be measured through thermomechanical analysis method based on JIS R 1618.

The above-mentioned aluminum oxide-titanium nitride sintered body of the present invention has proper volume resistivity, good milling property and void level, strength equivalent to AlTiC and higher heat conductivity than AlTiC. For this reason, it is suitably used for magnetic head substrates, pressure members of ultrasonic motors, dynamic pressure bearings or the like.

Specifically, in the magnetic head substrate according to the present invention, the above-mentioned aluminum oxide-titanium nitride sintered body of the present invention is used. This magnetic head substrate reduces a risk of electrostatic damage to magnetic head elements, enables highly accurate milling process with small variation in surface irregularity, prevents wear dust coming from a glass phase and corrosion, and can be suitably used as a magnetic head substrate which requires cleanliness. Compared to a magnetic head substrate made of currently mainstream AlTiC, this magnetic head substrate has higher heat conductivity, better heat radiating property, titanium nitride which has higher resistance to oxidation than titanium carbide, and thermal expansion coefficient equivalent to AlTiC, thereby leading to the great effects such as the possible use of conventional equipment.

Figure 2:
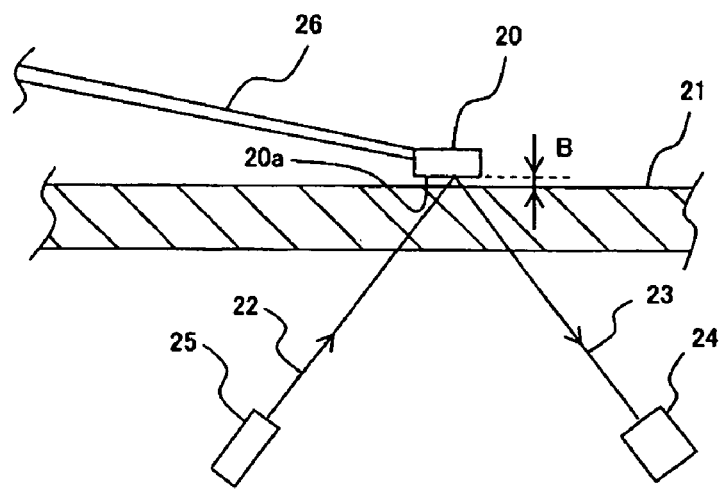
FIG. 2 is a schematic diagram showing how the flying height of a magnetic head slider is measured.
Figure 3:
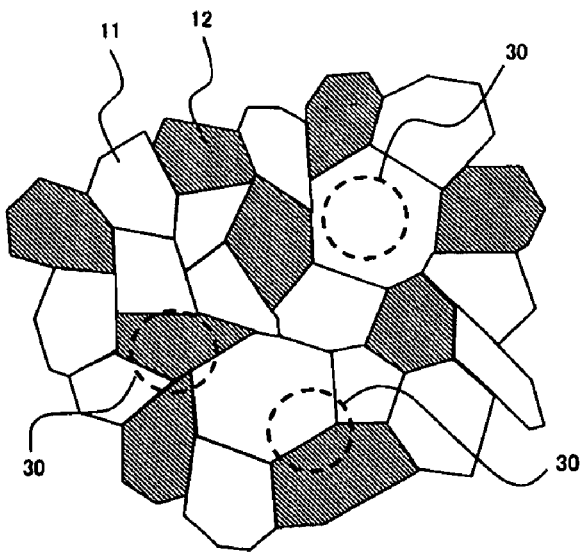
FIG. 3 is an enlarged schematic diagram showing the vicinity of the laser irradiating part on the flying surface of a magnetic head slider.
Figure 4:
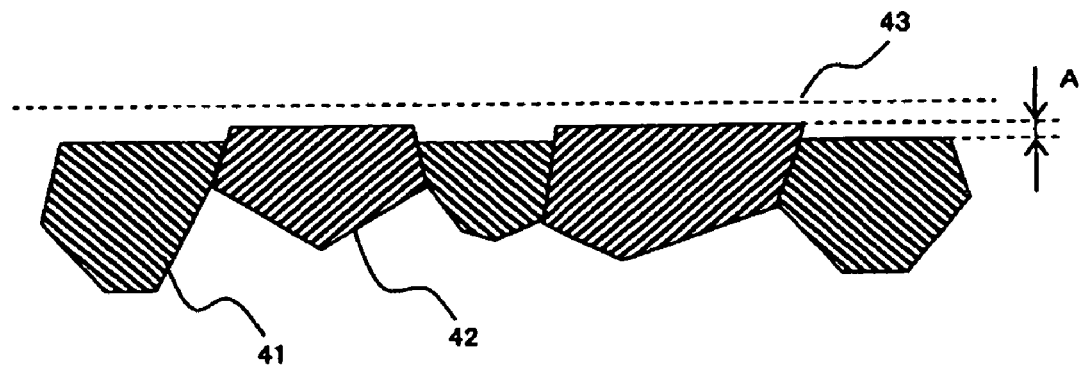
FIGS. 4(a) and (b) are schematic illustrations showing the relation of crystal grain size and processing rate.
FIG. 4(b) shows the case with smaller grain size.
Figure 4:
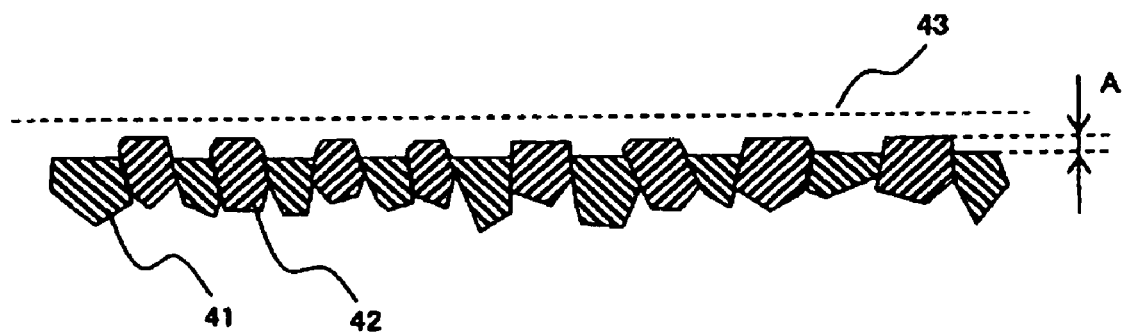
Figure 5:
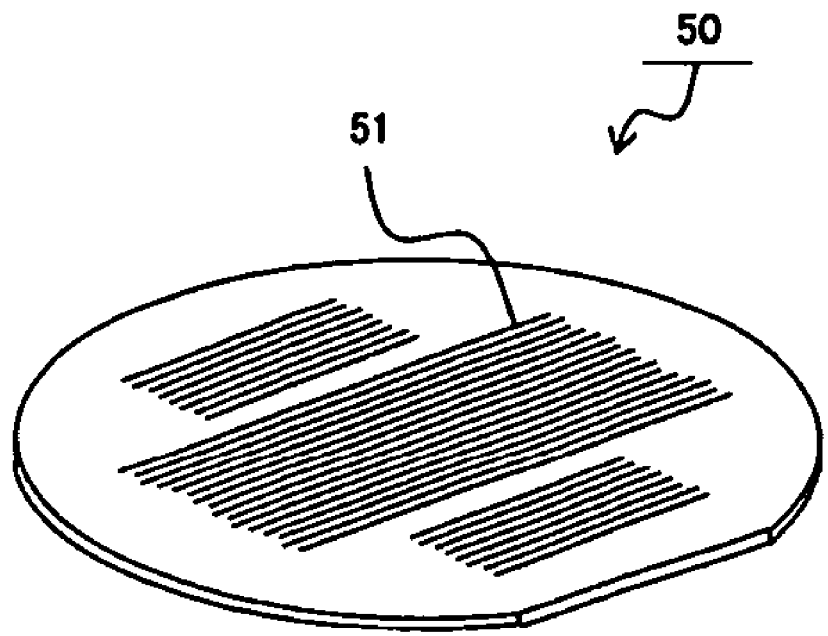
FIG. 5(a) is a perspective view showing a general substrate for a magnetic head and FIG. 5(b) is a perspective view showing a magnetic head.
Figure 5:
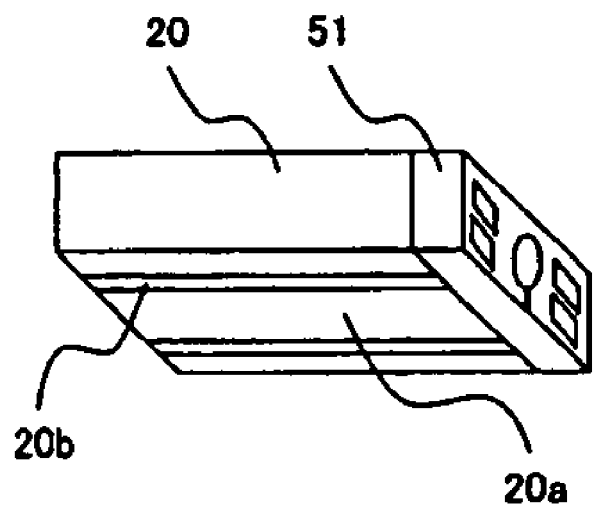

In particular, the sintered body which contains 0.005 to 1 parts by weight of at least one selected from ytterbium oxide and yttrium oxide as a sintering additive to 100 parts by weight of the main component enables the flying surface 20a shown in FIG. 2 to be processed with high accuracy through ion milling etc. Measuring the surface roughness after processing with an atomic force microscope (hereinafter, referred to as AFM), Ra turns not more than 20 nm, and thereby the sintered body can be suitably used as a magnetic head slider 20. In other words, since there is a very small amount of glass phase component on the grain boundary, irregularity harmful to the flying surface 20a after processing is very small, which makes it possible to fly and operate in a stable condition. With AlTiC, there are no voids of 1 μm or larger on the surface of a magnetic head substrate. Also, when using the sintered body of the present invention for a magnetic head substrate, void level is preferably equal to or better than that.

Figure 9:
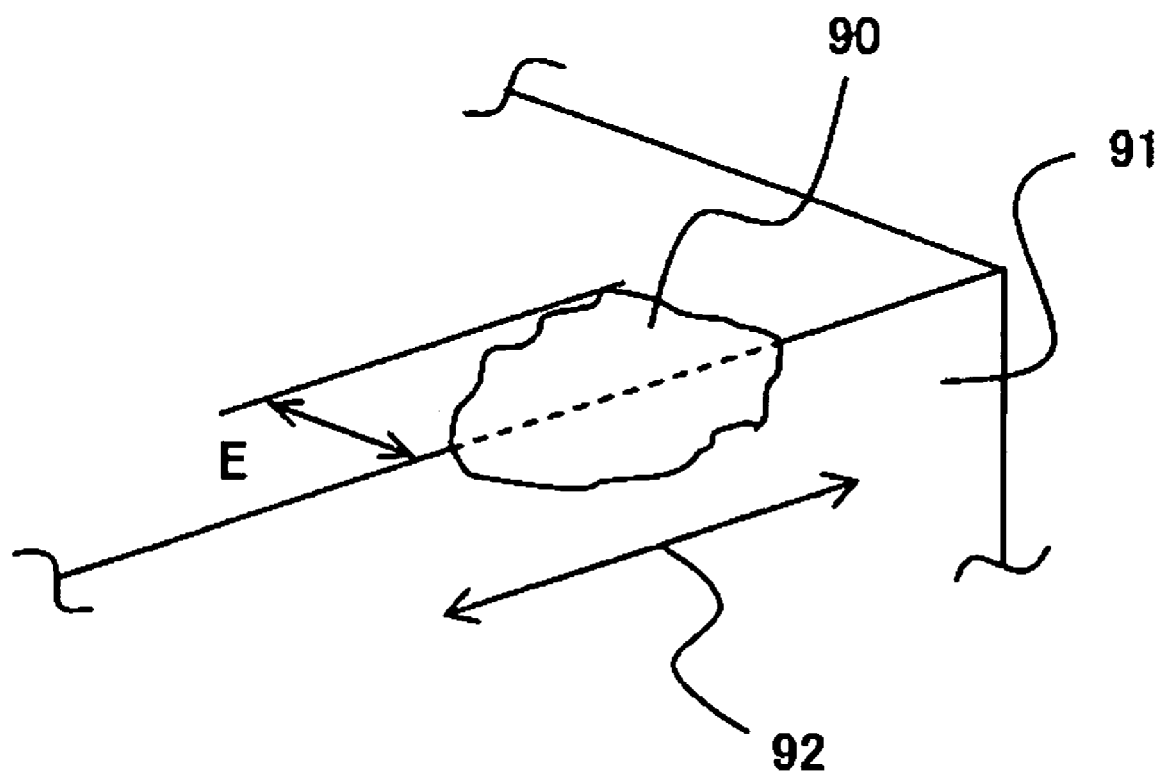
FIG. 9 is a schematic diagram showing usual chipping.

When a magnetic head element formed on the substrate is separated through slicing process, the magnetic head substrate of the present invention allows chipping 90 which occurs on the cut surface shown in FIG. 9 to become small and does not interfere in the magnetic head element to prevent functions. The marks 91, 92 and E in FIG. 9 respectively represent a cut surface, a slicing direction and chipping size.

Figure 6:
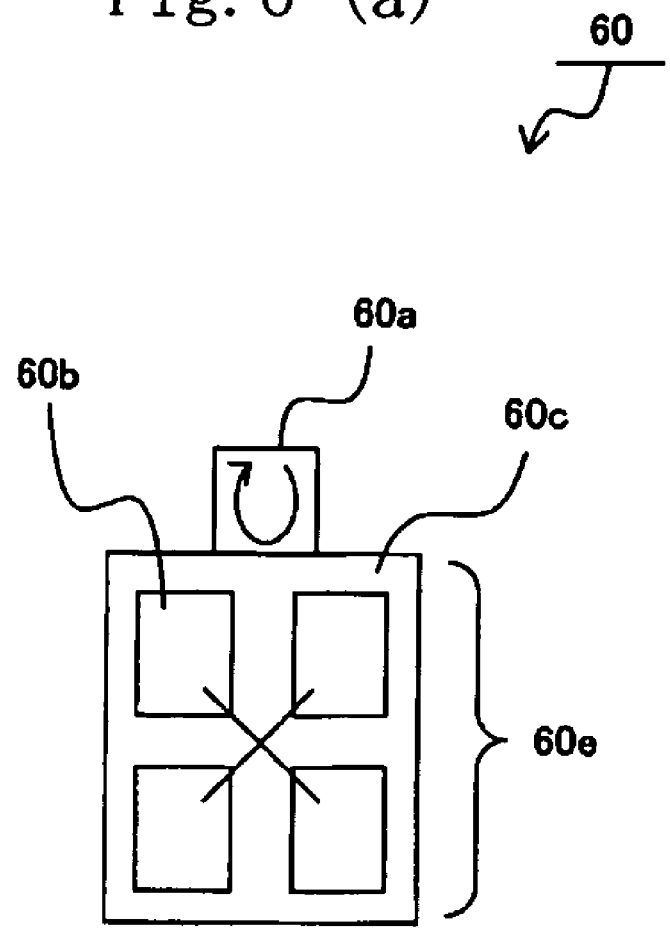
FIG. 6(a) is a schematic illustration showing one principal surface of a general ultrasonic motor and FIG. 6(b) is a schematic illustration showing the other principal surface.
Figure 6:
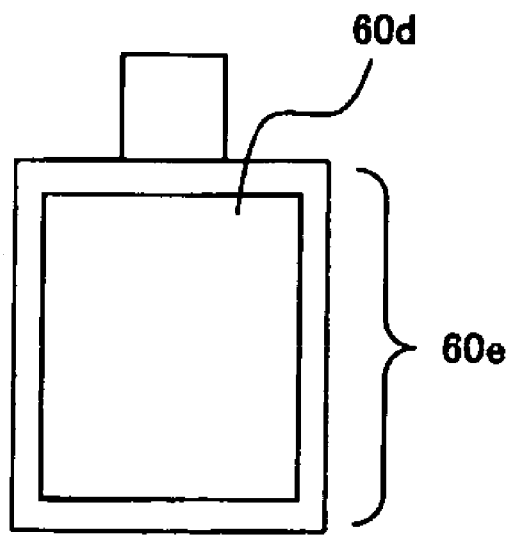
Figure 7:
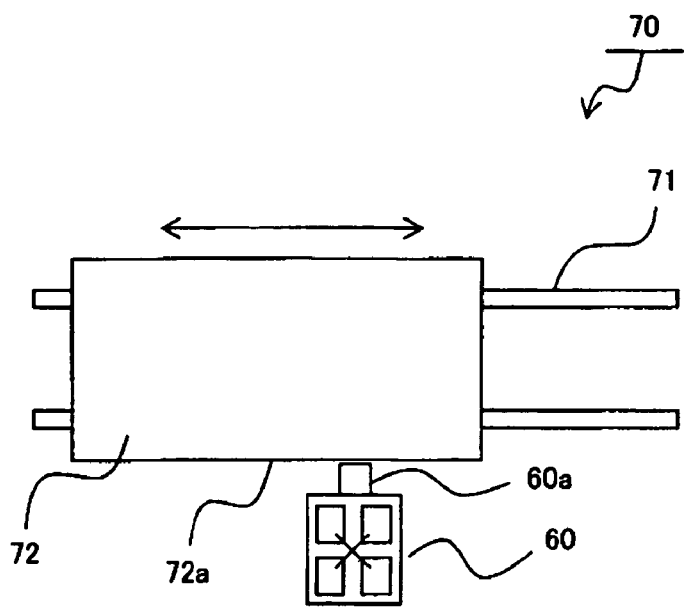
FIG. 7 is a schematic illustration showing guide apparatus in which the ultrasonic motor shown in FIG. 6 is employed.

In the ultrasonic motor according to the present invention, the above-mentioned aluminum oxide-titanium nitride sintered body of the present invention is used for a pressure member. The pressure member of the ultrasonic motor has good durability, enabling the motor to have longer lifetime. Specifically, the sintered body of the present invention is excellent in wear resistance and oxidation resistance. When the sintered body is used for the pressure member of an ultrasonic motor, it shows better durability than AlTiC which has been proposed so far. Moreover, with higher heat conductivity than AlTiC, it is possible to more quickly release frictional heat during driving, reduce deformation by thermal expansion in the pressure part and achieve precise feeding. FIG. 6 and FIG. 7 respectively show a bar-like ultrasonic motor and guide apparatus using it. However, the sintered body can be used for a ring-like ultrasonic motor.

In the dynamic pressure bearing according to the present invention, the above-mentioned aluminum oxide-titanium nitride sintered body of the present invention is used for a slide surface where dynamic pressure occurs. The dynamic pressure bearing is a bearing member excellent in wear resistance and sliding property. Specifically, because of good resistance to wear and oxidation, the sintered body of the present invention can be preferably used for the slide surface of the dynamic pressure bearing where contact and sliding occur at high speed. For example, the AlTiC dynamic pressure bearing (Japanese Unexamined Patent Publication No. 8-121467 etc.) which has been conventionally proposed is a material having better wear resistance and sliding property than a previous dynamic pressure bearing made of aluminum oxide. However, titanium nitride contained in the sintered body of the present invention has better resistance to oxidation than titanium carbide which exists on the slide surface of the AlTiC dynamic pressure bearing, and therefore makes it difficult to change the surface composition by frictional heat, which ensures the stable use even in the environment where a member has high temperature.

[Manufacturing Method]

The method for manufacturing an aluminum oxide-titanium nitride sintered body of the present invention will be now described. The method for manufacturing an aluminum oxide-titanium nitride sintered body of the present invention includes the steps of blending with titanium nitride powder which is synthesized through vapor phase deposition, forming and firing. This makes it possible to obtain an aluminum oxide-titanium nitride sintered body having few extraneous substances which is suitably used especially as a magnetic head substrate.

The titanium nitride used in the present invention is more preferably synthesized through vapor phase deposition whereby highly pure and finely-powdered raw material can be obtain than conventional methods including metallic nitriding method and heat carbon nitriding method. Vapor phase deposition here represents a method for synthesizing titanium nitride by heating titanium chloride vapor in reactive gas where nitriding reaction occurs. Examples of the reactive gas include a mixed gas of hydrogen and nitrogen, or ammonia.

On the other hand, metallic nitriding method is a method for synthesizing titanium nitride by heating metal powder in reactive gas. According to this method, from the viewpoint of safety in manufacturing, after synthesizing coarse-grained titanium nitride, grinding and pulverization are performed, and impurities get mixed during grinding after the synthesis. Therefore, titanium nitride synthesized through this method is not suitable for the magnetic head substrate of the present invention.

Heat carbon nitriding method is a method for synthesizing titanium nitride by heating a mixed powder of titanium oxide and carbon in reactive gas. Titanium nitride synthesized through this method is inexpensive, but is not suitable for the magnetic head substrate of the present invention because of low purity. However, it should be noted that titanium nitride obtained through other methods than vapor phase deposition can be used for the other applications such as wear resistant jigs or slide members.

To reduce impurities in the present invention, an alumina ball having a purity of not less than 99.9% is preferably used in grinding a raw material. If a cemented carbide ball or a zirconia ball is used in terms of grinding efficiency, for example, when the sintered body of the present invention is used for a magnetic head substrate, there is the problem that impurities mix in from a grinding ball, resulting in irregularity harmful to the ion milling surface.

It is preferable that the firing is performed with a hot press, at the highest temperature of 1530 to 1780° C. and at a pressure of 30 to 60 MPa. Thereby, it is possible to obtain the aluminum oxide-titanium nitride sintered body having fine crystal structure.

The highest temperature is 1530 to 1780° C. This is because a lower temperature than 1530° C. deteriorates sinterability. A temperature of 1780° C. or lower inhibits the growth of crystal grain size.

The pressure is 30 to 60 MPa, because a lower pressure than 30 MPa deteriorates sinterability and a pressure of 60 MPa or higher does not significantly improve sinterability in spite of increasing equipment cost.

It is preferable to keep the highest temperature for 30 minutes to 3 hours, because a period of less than 30 minutes is too short and causes sintering irregularity in a sintered body and a period of over 3 hours facilitates abnormal grain growth in crystal grain size.

In case of hot pressing, in order to prevent a sintered body from reacting with carbon which is used for a mold or a spacer, it is preferable to apply a parting agent such as boron nitride or graphite to a mold or a spacer.

According to the method of the present invention, it is possible to achieve further densification by subjecting the sintered body obtained through the aforementioned manufacturing method to hot isostatic pressing (HIP) in inert gas and eliminating residual voids. When the sintered body of the present invention is used for a magnetic head substrate, in order to reduce internal stress remaining in the interior of a magnetic head substrate, it is possible to perform annealing after hot pressing or HIP. Annealing is performed in vacuum or in inert gas such as helium, argon, nitrogen or the like. To prevent a magnetic head substrate from reacting with a setter, it is more preferable to use a floor plate or a case made of the same material as the magnetic head substrate.

The sintered body of the present invention can be also used for tweezers to hold electronic parts, cases, jigs, slide members and the like.

Examples of the present invention will be described below. It is understood, however, that the examples are for the purpose of illustration and the invention is not to be regarded as limited to any of the specific materials or condition therein.

EXAMPLES

Example 1

First, the relation among the total mean crystal grain size, milling property and void level in the sintered body of the present invention will be described.

Aluminum oxide having a purity of not less than 99.99% by weight and titanium nitride having a purity of not less than 95% by weight as main component, and ytterbium oxide as a sintering additive were prepared. Aluminum oxide and titanium nitride which are the main component were blended by the ratio of aluminum oxide:titanium nitride=75% by weight: 25% by weight. To 100 parts by weight of the main component, 0.1 parts by weight of ytterbium oxide was added and put into a vibrating mill together with IPA (isopropyl alcohol). Using a zirconium oxide grinding ball, wet grinding was performed to obtain slurry. The reason why, instead of water, IPA was used for grinding is to prevent the oxidation of titanium nitride as much as possible.

The grain size distributions for aluminum oxide and titanium nitride after grinding were respectively adjusted to the following range: aluminum oxide: D50=0.12 to 1.45 and; titanium nitride: D50=0.15 to 1.1. The grain size distribution was measured through laser diffractometry, using the Microtrac (9320-X100 by NIKKISO Co., Ltd.).

A small amount of binder was added to and mixed with the slurry obtained after grinding. Then, IPA was evaporated, and powder raw material was obtained by passing through mesh. Next, the powder raw material so obtained underwent press molding to form a forming body. After debinding, hot pressing was performed by induction heating at a preset temperature of 1400 to 1800° C., at a pressure of 30 to 60 MPa and for the holding period of 0.1 to 4 hours, thereby preparing a plurality of samples having a size of φ127×T2.5 to φ127×T 3.5 mm. Moreover, these samples were processed with a flat-surface grinding machine so as to have a thickness of 2 mm, and with a lapping machine so as to have mirror finished surface.

Subsequently, observing the mirror finished surface at a magnification of 3000 with an SEM (JSM6700F by JEOL Ltd.), the total mean crystal grain size was measured through code method and the figures so obtained were rounded off to the tenth. Before observation under an SEM, firing and etching were performed at a temperature 50 to 200° C. lower than firing temperature with a vacuum furnace so as to easily observe grain boundary.

To evaluate milling property, the mirror finished samples underwent milling process with argon ions, and their surface roughness was measured with an AFM. The conditions of milling process were an argon ion accelerating voltage of 600V, a milling rate of 200 Å/minute and a period of 10 minutes. Each sample had a surface roughness Ra of 1 to 2 nm before milling process, and after processing it by about 0.5 μm, the surface condition was observed. A sample having Ra of 20 nm or less was rated as acceptance (○) and a sample having Ra of over 20 nm was rated as rejection (X).

To evaluate void level, photographs were taken at a magnification of 3000 with an SEM. A sample containing 50 or less voids having a diameter of 1 μm or less in the area of 301 μm×30 μm was rated as acceptance (○), and among such samples, an excellent sample containing 25 or less voids was marked "◎". A sample containing 51 or more voids having a diameter of 1 μm or less or containing voids having a diameter of over 1 μm in the area of 30 μm×30 μm was rated as rejection (X). As a void diameter, the value obtained by dividing the sum of the major and minor axes of a void by two was employed.

The evaluation results of the total mean crystal grain size, milling property and void level were shown in Table 1. In each sample so obtained, aluminum oxide had a mean crystal grain size of 1.7 μm and titanium nitride had a mean crystal grain size of 0.9 μm.

TABLE 1

|  | No. | Total mean crystal grain size (μm) | Milling property | Void level |
|---|---|---|---|---|
| * | 1 | 0.3 | X | X |
|  | 2 | 0.4 | ○ | ○ |
|  | 3 | 0.5 | ○ | ◎ |
|  | 4 | 0.8 | ○ | ◎ |
|  | 5 | 1.0 | ○ | ◎ |
|  | 6 | 1.4 | ○ | ◎ |
|  | 7 | 2.0 | ○ | ○ |
| * | 8 | 2.3 | X | ○ |
| * | 9 | 2.9 | X | ○ |

Sample marked "*" is out of the scope of the present invention.

As apparent from Table 1, Sample Nos. 2 to 7 which are the examples of the present invention showed good conditions in milling property and void level. There was no large difference in milling property among Sample Nos. 2 to 7, but Sample Nos. 3 to 6 were excellent in void level and found to be preferably used for slide members such as magnetic head sliders.

On the other hand, in Sample No. 1 which is a comparative example, the total mean crystal grain size was small, but milling property and void level were considered to be lowered because of insufficient sintering. In Sample Nos. 8 to 9 as comparative examples, void level was rated as acceptance, but compared to Sample Nos. 2 to 7, more marks of grain dropping were observed and it also took 10 to 50% longer time to perform mirror finishing. Moreover, milling property was worsened, which is considered to be a clear indication of the difference in milling rate among crystal phases.

Next, the relation between the total mean crystal grain size of aluminum oxide and titanium nitride and the flexural strength will be described.

In a similar way to the above, Sample Nos. 12 to 21 as the examples of the present invention and Sample Nos. 10, 11 and 22 to 24 as comparative examples were prepared. 65% by weight of aluminum oxide and 35% by weight of titanium nitride were separately ground with a vibrating mill, and after adjusting each grain size, mixing and stirring were performed. IPA was evaporated to form a forming body from powder raw material and then hot pressing was performed.

Ytterbium oxide as a sintering additive was ground together with aluminum oxide, and blended so as to constitute 0.1 parts by weight to the total 100 parts by weight of aluminum oxide and titanium nitride which are the main component.

Similarly, Sample Nos. 27 to 36 as the examples of the present invention and Sample Nos. 25, 26 and 37 to 39 as comparative examples were prepared. To the total 100 parts by weight of 85% by weight of aluminum oxide and 15% by weight of titanium nitride, 0.1. parts by weight of ytterbium oxide was blended, and hot pressing was performed.

In hot pressing, temperature and pressure were set so as to obtain the total mean crystal grain size shown in Table 2. At this time, the mean crystal grain size of titanium nitride was in the range of 30 to 100% to that of aluminum oxide.

Crystal grain size was measured in the above manner, and flexural strength was obtained with three-point bending test (JIS R 1601).

Figure 8:
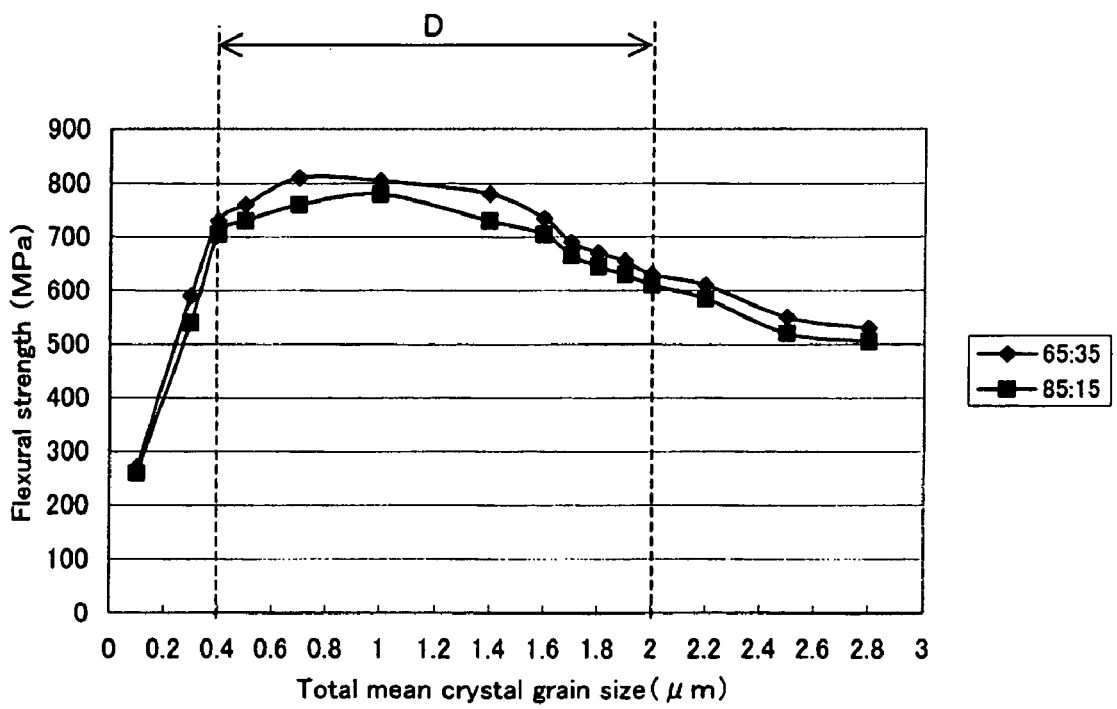
FIG. 8 is a graph showing the relation between the total mean crystal grain size and the flexural strength in the present invention.

Table 2 represents the results, and FIG. 8 is their graphic representation. In Table 2, strength stands for flexural strength, and the mark D in FIG. 8 indicates the range of the total mean crystal grain size of the present invention. In each sample so obtained, aluminum oxide had a mean crystal grain size of 1.7 μm and titanium nitride had a mean crystal grain size of 0.9 μm.

TABLE 2

|  |  | Mass ratio % | | Total mean | |
|---|---|---|---|---|---|
|  | No. | Aluminum oxide | Titanium nitride | crystal grain size (μm) | Strength (MPa) |
| * | 10 | 65 | 35 | 0.1 | 270 |
| * | 11 |  |  | 0.3 | 590 |

TABLE 2-continued

| | Mass ratio % | | Total mean | |
| No. | Aluminum oxide | Titanium nitride | crystal grain size (μm) | Strength (MPa) |
|---|---|---|---|---|
| 12 | | | 0.4 | 730 |
| 13 | | | 0.5 | 760 |
| 14 | | | 0.7 | 810 |
| 15 | | | 1 | 805 |
| 16 | | | 1.4 | 780 |
| 17 | | | 1.6 | 735 |
| 18 | | | 1.7 | 690 |
| 19 | | | 1.8 | 670 |
| 20 | | | 1.9 | 655 |
| 21 | | | 2 | 630 |
| * 22 | | | 2.2 | 610 |
| * 23 | | | 2.5 | 550 |
| * 24 | | | 2.8 | 530 |
| * 25 | 85 | 15 | 0.1 | 260 |
| * 26 | | | 0.3 | 540 |
| 27 | | | 0.4 | 705 |
| 28 | | | 0.5 | 730 |
| 29 | | | 0.7 | 760 |
| 30 | | | 1 | 780 |
| 31 | | | 1.4 | 730 |
| 32 | | | 1.6 | 705 |
| 33 | | | 1.7 | 665 |
| 34 | | | 1.8 | 645 |
| 35 | | | 1.9 | 630 |
| 36 | | | 2 | 610 |
| * 37 | | | 2.2 | 585 |
| * 38 | | | 2.5 | 520 |
| * 39 | | | 2.8 | 505 |

Sample marked '*' is out of the scope of the present invention.

From Table 2 and FIG. 8, it is found that Sample Nos. 12 to 21 and Nos. 27 to 36 which are the examples of the present invention, having a total mean crystal grain size of not less than 0.4 μm and not more than 2.0 μm, had a flexural strength of not less than 600 MPa, which can be regarded as strength equivalent to AlTiC. When the total mean crystal grain size is in the range of not less than 0.4 μm and not more than 1.6 μm, flexural strength reaches not less than 700 MPa, and it is apparent that this range is more preferable.

On the other hand, in Sample Nos. 10, 11, 25 and 26 which are comparative examples, the total mean crystal grain size was small, but strength seemed to be lowered because of insufficient sintering. In Sample Nos. 22 to 24 and Nos. 37 to 39 which are comparative examples, flexural strength was small compared to the examples, and milling property was rated as rejection after being evaluated in the same manner as above.

Example 2

Next, the mean crystal grain size of aluminum oxide, the mean crystal grain size of titanium nitride and the strength of the sintered body will be described.

The sintered body wherein the mean crystal grain size of aluminum oxide is less than 0.5 μm, the sintered body wherein the mean crystal grain size of aluminum oxide is over 2.2 μm, the sintered body wherein the mean crystal grain size of titanium nitride is less than 0.2 μm and the sintered body wherein the mean crystal grain size of titanium nitride is over 1.6 μm were prepared. The total mean crystal grain size of all these sintered bodies was in the range of the present invention. Table 3 shows the measurement results of their flexural strength. The method for preparing the samples and the method for measuring crystal grain size and flexural strength were the same as Example 1.

TABLE 3

| | Total mean | Mean crystal grain size (μm) | | Mass ratio (%) | | Flexural |
| No. | crystal grain size (μm) | Aluminum oxide | Titanium nitride | Aluminum oxide | Titanium nitride | strength (MPa) |
|---|---|---|---|---|---|---|
| * 40 | 0.4 | 0.3 | 0.6 | 65 | 35 | 540 |
| 41 | 0.5 | 0.5 | 0.6 | | | 610 |
| 42 | 0.8 | 1 | 0.7 | | | 780 |
| 43 | 1.2 | 2.2 | 0.8 | | | 720 |
| * 44 | 1.4 | 2.5 | 0.8 | | | 550 |
| * 45 | 0.5 | 0.8 | 0.1 | | | 530 |
| 46 | 0.5 | 0.8 | 0.2 | | | 660 |
| 47 | 1.2 | 1.1 | 1.6 | | | 600 |
| * 48 | 1.4 | 1.1 | 1.9 | | | 460 |
| * 49 | 2 | 2 | 1.9 | 85 | 15 | 510 |
| 50 | 1.8 | 2 | 1.6 | | | 650 |
| 51 | 0.9 | 1.1 | 0.6 | | | 720 |
| 52 | 0.4 | 0.5 | 0.2 | | | 650 |
| * 53 | 0.4 | 0.5 | 0.1 | | | 540 |
| * 54 | 0.5 | 0.3 | 0.8 | | | 520 |
| 55 | 0.6 | 0.5 | 0.8 | | | 600 |
| 56 | 1.7 | 2.2 | 0.5 | | | 620 |
| * 57 | 1.9 | 2.7 | 0.5 | | | 510 |

Sample marked '*' is out of the scope of the present invention.

From Table 3, it is found that Sample Nos. 41 to 43, 46, 47, 50 to 52, 55 and 56 which are the examples of the present invention had a flexural strength of not less than 600 Mpa, that is, flexural strength equivalent to AlTiC. Sample Nos. 42 and 43 had a flexural strength 100 MPa higher than Sample No. 41. It is considered that this is because aluminum oxide had a larger mean crystal grain size than titanium nitride, and very small residual voids in the crystal grain boundary during sintering were decreased.

On the other hand, in Sample Nos. 40 and 54 which are comparative examples, it seems that because of insufficient sintering, aluminum oxide had a small mean crystal grain size, and flexural strength was lowered. In Sample Nos. 44 and 57 which are comparative examples, it seems that because of too sufficient sintering, the mean crystal grain size of aluminum oxide was beyond the range of the present invention, and flexural strength was lowered.

Sample Nos. 45 and 53 which are comparative examples took twice as much time in grinding titanium nitride as Sample Nos. 46 and 52 which are the examples of the present invention, and have had the problem that there was little effect of improving material characteristics.

In Sample Nos. 48 and 49 which are comparative examples, the mean crystal grain size of titanium nitride was out of the scope of the present invention, and flexural strength was found to be lowered. It is considered that since titanium nitride had a too large mean crystal grain size, sinterability was lowered and very small voids remained in the crystal grain boundary.

Example 3

The mass ratio of aluminum oxide and titanium nitride in the sintered body of the present invention will be now described.

The mass ratio of aluminum oxide, titanium nitride and ytterbium oxide, preset temperature and hot pressing pressure were adjusted according to the conditions shown in Table 4 to prepare a sintered body. Regarding the sintered body so obtained, volume resistivity, heat conductivity, thermal expansion coefficient, flexural strength and total mean crystal grain size were measured, and void level and milling property were evaluated. The results were shown in Table 4.

Flexural strength, total mean crystal grain size, void level and milling property were measured in the same manner as Example 1. Volume resistivity was measured through four-point probe method and double ring method, and heat conductivity was measured through laser flash method. In each sample so obtained, aluminum oxide had a mean crystal grain size of 1.7 μm and titanium nitride had a mean crystal grain size of 0.9 μm.

TABLE 4

| | No. | Total mean crystal grain size (μm) | Composition (% by weight) Aluminum oxide | Titanium nitride | ×Ytterbium oxide | Firing temperature (° C.) | Hot pressing pressure (MPa) |
|---|---|---|---|---|---|---|---|
| * | 58 | — | 75 | 25 | 0.1 | 1680 | 70 |
| * | 59 | 0.4 | 95 | 5 | | 1440 | 60 |
| * | 60 | 0.4 | 90 | 10 | | 1480 | |
| | 61 | 0.7 | 85 | 15 | | 1530 | |
| | 62 | 0.9 | 80 | 20 | | 1630 | |
| | 63 | 1.1 | 75 | 25 | | 1680 | |
| | 64 | 1.5 | 70 | 30 | | 1710 | |
| | 65 | 1.7 | 65 | 35 | | 1750 | |
| * | 66 | 1.8 | 60 | 40 | | 1780 | |
| * | 67 | 0.3 | 95 | 5 | | 1440 | 30 |
| * | 68 | 0.4 | 90 | 10 | | 1480 | |
| | 69 | 0.7 | 85 | 15 | | 1530 | |
| | 70 | 0.9 | 80 | 20 | | 1630 | |
| | 71 | 0.9 | 75 | 25 | | 1680 | |
| | 72 | 1.4 | 70 | 30 | | 1710 | |
| | 73 | 1.5 | 65 | 35 | | 1750 | |
| * | 74 | 1.8 | 60 | 40 | | 1780 | |
| * | 75 | — | 75 | 25 | | 1680 | 20 |

| | No. | Volume resistivity (Ω·cm) | Heat conductivity W/(m·K) | Thermal expansion coefficient ppm/° C. | Flexural strength (MPa) | Void level | Evaluation on milling property |
|---|---|---|---|---|---|---|---|
| * | 58 | | | Crack occurs | | | |
| * | 59 | $10^{10}$ | 30 | 7.8 | 390 | ○ | ○ |
| * | 60 | $10^{7}$ | 30 | 7.8 | 450 | ○ | ○ |
| | 61 | $10^{0}$ | 30 | 7.8 | 660 | ○ | ○ |
| | 62 | $10^{-1.1}$ | 28 | 7.5 | 730 | ○ | ○ |
| | 63 | $10^{-2.2}$ | 28 | 7.5 | 730 | ○ | ○ |
| | 64 | $10^{-3}$ | 26 | 7.4 | 740 | ○ | ○ |
| | 65 | $10^{-3}$ | 25 | 7.2 | 670 | ○ | ○ |
| * | 66 | $10^{-3.7}$ | 26 | 7.2 | 550 | X | X |
| * | 67 | $10^{14}$ | 29 | 7.8 | 360 | ○ | ○ |
| * | 68 | $10^{7}$ | 25 | 7.8 | 430 | ○ | ○ |
| | 69 | $10^{5.9}$ | 25 | 7.7 | 620 | ○ | ○ |

TABLE 4-continued

|   | | | | | | |
|---|---|---|---|---|---|---|
|  | 70 | $10^{5.4}$ | 24 | 7.5 | 700 | ○ ○ |
|  | 71 | $10^5$ | 24 | 7.4 | 710 | ○ ○ |
|  | 72 | $10^4$ | 24 | 7.4 | 710 | ○ ○ |
|  | 73 | $10^{3.6}$ | 23 | 7.3 | 650 | ○ ○ |
| * | 74 | $10^3$ | 23 | 7.2 | 510 | X X |
| * | 75 | | | Not sintering | | |

Sample marked '*' is out of the scope of the present invention.
✕The amount of added ytterbium oxide to the total 100 parts by weight of aluminum oxide and titanium nitride It is apparent from Table 4 that Sample Nos. 61 to 65 and Sample Nos. 69 to 73 had a volume resistivity in the range of $10^{-3}$ Ω·cm or more to less than $10^6$ Ω·cm, and a heat conductivity equivalent to or more than that of AlTiC (20 to 23 W/(m·K)) and that they can be used as a magnetic head substrate having better heat radiating property than AlTiC.

The thermal expansion coefficient was not less than 7.2 ppm/° C. to not more than 7.8 ppm/° C. Even if amorphous alumina film is formed on the ceramic sintered body of the present invention through sputtering, since thermal expansion coefficient is at the same level, there is little risk of peeling during heating and cooling.

By contrast, Sample Nos. 66 and 74 which are comparative examples were rated as rejection in void level. It is found that in the comparative example, Sample No. 58, since hot pressing pressure was too large, some cracks were observed and yield was low, while in the comparative example, Sample No. 75, since hot pressing pressure was too small, sinterability was deteriorated and yield was low. From this result, it is apparent that in the sintered body of the present invention, preferably, the hot pressing pressure is 30 to 60 MPa and the firing temperature is 1530 to 1780° C.

Milling property was evaluated under the condition shown in Example 1. Sample Nos. 61 to 65 and Sample Nos. 69 to 73 had a surface roughness Ra of 4 to 7 nm and reached almost the same level, thereby being rated as acceptance. Meanwhile, the comparative examples, Sample Nos. 66 and 75 had many residual voids, large variation in measured value and a surface roughness Ra of not less than 20 nm in milling property. It is found that they are not suitably used, for example, as a magnetic head substrate.

Example 4

The following description is the case where a sintered additive is added to the sintered body of the present invention.

The mass ratio of aluminum oxide and titanium nitride which are the main component was set to 65:35, that is, the ratio which makes sinterability the lowest in the scope of the present invention.

Sintering additives A to C were respectively added to the total 100 parts by weight of aluminum oxide and titanium nitride which are the main component. In the sintering additive A, only ytterbium oxide was added. In the sintering additive B, ytterbium oxide, magnesium oxide and zirconium oxide were blended and added at the mass ratio of ytterbium oxide:magnesium oxide:zirconium oxide=2:5:2. In the sintering additive C, ytterbium oxide, magnesium oxide, zirconium oxide, silicon oxide and calcium oxide were added at the ratio of ytterbium oxide:magnesium oxide:zirconium oxide:silicon oxide:calcium oxide=1:2:1:2:1. The added amount of these sintering additives and the firing method were changed according to the conditions shown in Table 5. Thus, each sample (Sample Nos. 79 to 99 of Table 5) that is a sintered body was prepared and evaluated in terms of material characteristics. For comparison, the samples (Sample Nos. 76 to 78 of Table 5) in which a sintering additive was not added were prepared.

A hot press and a vacuum furnace were used for firing. Hot pressing pressure was fixed at 40 MPa, and firing temperature was controlled with B thermocouple built in a graphitic die. In the vacuum furnace, at not less than 500° C., argon was introduced with a pressure of 30 to 80 kPa, and R thermocouple was used to control the low temperature range of not more than 1400° C. while tungsten-rhenium thermocouple was used to control the high temperature range of over 1400° C. Argon was introduced into the furnace to prevent the surface of the sintered body from change in quality. Instead, nitrogen or helium can be used.

Except the aforementioned conditions, the samples were prepared in the same manner as Example 1. In each sample so obtained, as in Example 1, total mean crystal grain size and flexural strength were measured. Table 5 shows the results. In each sample so obtained, aluminum oxide had a mean crystal grain size of 1.7 μm and titanium nitride had a mean crystal grain size of 0.9 μm.

TABLE 5

|   | No. | Sintering additive | Added amount (parts by weight) | Hot press firing temperature (° C.) | Vacuum furnace firing temperature (° C.) | Total mean crystal grain size (μm) | Strength (MPa) | Aggregation |
|---|---|---|---|---|---|---|---|---|
|  | 76 | — | 0 | 1630 | — | 0.6 | 550 | ○ |
|  | 77 |  | 0 | 1780 | — | 1.4 | 670 | ○ |
| * | 78 |  | 0 | 1800 | — | 2.3 | 440 | ○ |
|  | 79 | Sintering | 0.002 | 1630 | — | 0.7 | 580 | ○ |
|  | 80 | additive | 0.005 | 1630 | — | 0.7 | 670 | ○ |
|  | 81 | A | 0.01 | 1630 | — | 0.9 | 730 | ○ |
|  | 82 |  | 0.5 | 1630 | — | 1.1 | 720 | ○ |
|  | 83 |  | 1 | 1630 | — | 1.3 | 660 | ○ |

TABLE 5-continued

|   | No. | Sintering additive | Added amount (parts by weight) | Hot press firing temperature (° C.) | Vacuum furnace firing temperature (° C.) | Total mean crystal grain size (μm) | Strength (MPa) | Aggregation |
|---|---|---|---|---|---|---|---|---|
|   | 84 |   | 1.5 | 1630 | — | 1.4 | 590 | ○ |
| * | 85 |   | 1.5 | — | 1800 | 2.6 | 190 | X |
| * | 86 | Sintering | 2 | — | 1800 | 3.3 | 250 | — |
|   | 87 | additive | 5 | — | 1780 | 1.9 | 600 | — |
|   | 88 | B | 8 | — | 1730 | 1.4 | 620 | — |
|   | 89 |   | 15 | — | 1730 | 1.3 | 650 | — |
|   | 90 |   | 20 | — | 1730 | 1.3 | 600 | — |
|   | 91 |   | 20 | 1550 | — | 0.9 | 740 | — |
|   | 92 |   | 25 | — | 1730 | 1.7 | 550 | — |
| * | 93 | Sintering | 2 | — | 1800 | 2.9 | 220 | — |
|   | 94 | additive | 5 | — | 1780 | 1.8 | 550 | — |
|   | 95 | C | 8 | — | 1750 | 1.5 | 610 | — |
|   | 96 |   | 15 | — | 1710 | 1.6 | 640 | — |
|   | 97 |   | 20 | — | 1710 | 1.6 | 620 | — |
|   | 98 |   | 20 | 1500 | — | 0.8 | 710 | — |
|   | 99 |   | 25 | — | 1710 | 1.8 | 510 | — |

Sample marked "*" is out of the scope of the present invention.

Regarding Sample Nos. 76 to 78 with no sintering additive added, the following is apparent from Table 5. Sample Nos. 76 and 77 had the total mean crystal grain size in the scope of the present invention while a comparative example, Sample No. 78 had the total mean crystal grain size out of the scope of the present invention and lower strength since the firing temperature was too high. That means when no sintering additive is added, firing temperature is desirably not more than 1780° C.

It is found that due to the sintering additive A, Sample Nos. 79 to 83 had more sinterability even at low temperature than additive-free samples. These samples can be sintered even at low temperature and become a dense sintered body and therefore a material having a small total mean crystal grain size, large strength and less aggregate grains of a sintering additive, which can be preferably used as a magnetic head substrate. Compared to the samples containing not more than 1 part by weight of sintering additive, Sample No. 84 had more aggregate grains, and therefore it is unsuitable for a magnetic head substrate but suitable for a jig or a slide member. Meanwhile, when sintering a comparative example, Sample No. 85 with a vacuum furnace, sintering was not sufficient even at a firing temperature of 1800° C. and strength was not increased. Therefore, when a sintering additive is not more than 1 part by weight, it is preferable to use a hot press.

The aggregate grains of ytterbium oxide were observed at a magnification of 750 in the area of 1 cm² under an SEM. In Table 5, a sample having not more than 50 aggregate grains was marked "○" while a sample having over 50 aggregate grains was marked "X ".

With the sintering additive B added, Sample Nos. 86 to 92 were sintered mainly with a vacuum furnace. In a comparative example, Sample No. 86, 2 parts by weight of sintering additive B was added to 100 parts by weight of the main component. However, because of using a vacuum furnace, even firing at 1800° C. did not expedite sintering. Although aluminum oxide had grain growth, a dense sintered body was not obtained and the total mean crystal grain size was not in the scope of the present invention.

In Sample Nos. 87 to 91, thanks to 5 to 20 parts by weight of sintering additive B, sinterability was improved and the total mean crystal grain size was in the scope of the present invention. In addition, the use of a hot press made it possible to sinter Sample No. 91 at low temperature.

Sample No. 92 was found to have lower strength than other samples although it was in the scope of the present invention. It seems that this is because the amount of a sintering additive turned larger, thereby lowering strength in the grain boundary.

With the sintering additive C added, Sample Nos. 93 to 99 were sintered mainly with a vacuum furnace. In a comparative example, Sample No. 93, 2 parts by weight of sintering additive C was added to 100 parts by weight of the main component. However, because of using a vacuum furnace, even firing at 1800° C. did not expedite sintering. Although aluminum oxide had grain growth, a dense sintered body was not obtained and the total mean crystal grain size was not in the scope of the present invention.

In Sample Nos. 94 to 98, thanks to 5 to 20 parts by weight of sintering additive C, sinterability was improved and the total mean crystal grain size was in the scope of the present invention. In addition, the use of a hot press made it possible to sinter Sample No. 98 at low temperature.

Sample No. 99 was found to have lower strength than other samples although it was in the scope of the present invention. It seems that this is because the amount of a sintering additive turned larger, thereby lowering strength in the grain boundary.

The sintering additive C was apt to lower firing temperature, compared to the sintering additive B. It is considered that this is because silicon oxide and calcium oxide had some influence.

It is found from the above that the sintered body of the present invention can be sintered both with a hot press and a vacuum furnace, adding a sintering additive in a proper range.

Example 4 describes an example of the blend ratio of a sintering additive, but it should be noted that the present invention is not limited to this. For example, instead of ytterbium oxide, yttrium oxide can be added to achieve similar effects, and other alternatives can be properly selected.

Example 5

The amount of particles coming from the sintered body of the present invention will be described.

For measurement, Sample Nos. 76, 78, 80, 82, 83 and 85 of Example 4 were employed. The samples used here had a discoidal shape of φ127×T2 mm and mirror finished surface on both sides. The mirror finished surface was prepared so as to have Ra of not more than 5 nm when measuring 20×20 μm with an AFM. Using a grinding machine, the peripheral edge was processed into a predetermined size with #400 diamond wheel so that the C plane of 0.3 was formed.

The conditions for measuring particles were as follows. Before measuring the amount of particles, the samples underwent ultrasonic cleaning (38 kHz, 1200 W) in pure water for one minute, and dirt on the surface was removed. Subsequently, the samples further underwent ultrasonic cleaning in pure water, and then the amount of particles having a size of not less than 1 μm contained in the pure water was measured for 10 ml with a liquid particle counter (PARTICLE COUNTER KL-11 by RION Co., Ltd.). Measurement was made at three points for each, and their average was figured out. A sample having not more than 10000 particles was rated as acceptance (○) while a sample having over 10000 particles was rated as rejection (X).

In addition, the state of chipping 90 (FIG. 9) occurring on the cut surface during slicing process in the same samples was observed. The conditions for slicing process were as follows: a wheel of 100 mm in diameter×0.18 mm in width; revolution of 7000 rpm; feed rate of 60 mm/minute; and down cut. A plurality of lines were formed so as to have a total length of 1000 mm. Then, observation was made at a magnification of 500 in 100 points with a metallographic microscope to measure the maximum value of chipping size E. The chipping size E of not more than 10 μm was rated as acceptance (○) while the chipping size E of over 10 μm was rated as rejection (X).

The acceptance criterion for particle amount and chipping size was determined, considering the case where AlTiC substrate was measured under the same conditions.

The measurement results of particles and chipping were shown in Table 6.

It is apparent from Table 6 that as a smaller amount of sintering additive is added, the particle amount is more likely to decrease. The possible reason for this is that a glass phase rarely exists in the grain boundary phase between aluminum oxide and titanium nitride.

Sample Nos. 78 and 85 had a chipping size of over 10 μm. In Sample No. 78, the total mean crystal grain size was not less than 2.3 μm and grain dropping during cutting is considered to have had a significant influence on chipping size. In Sample No. 85, a large number of sintering additive was added and a lot of aggregate grains existed (refer to Example 4). It is considered that the aggregate grains existing in the vicinity of the cut surface 91 made chipping 90 large.

Example 6

The numerical range of the mean crystal grain size of aluminum oxide and titanium nitride according to the present invention was described.

The total mean crystal grain size of 75% by weight of aluminum oxide and 25% by weight of titanium nitride which are the main component was set to 1.2 μm. By changing each mean crystal grain size of aluminum oxide and titanium nitride in the range shown in Table 7, Sample Nos. 100 to 113 were obtained. Their flexural strength, mirror finishing property and conductivity were measured, and the results were presented in Table 7.

The method for preparing a sample and the method for measuring crystal grain size and flexural strength were the same as Example 1. Regarding mirror finishing property, a sample which makes mirror finishing easy was rated as acceptance (○) while a sample which makes mirror finishing difficult was rated as rejection (X). Conductivity was evaluated, measuring the center part of the opposite faces in a magnetic head-like sample with a normal tester. A sample having a surface resistivity of not more than $10^{-1}$ Ω·cm² was rated as acceptance (○) while a sample having a surface resistivity of over $10^{-1}$ Ωcm² was rated as rejection (X).

TABLE 6

| | No. | Amount of added sintering additive (parts by weight) | Total mean crystal grain size (μm) | Partical amount pieces/cm² | Evaluation on particles | Chipping size (μm) | Evaluation on chipping |
|---|---|---|---|---|---|---|---|
| | 76 | 0 | 0.6 | 4571 | ○ | 5.5 | ○ |
| * | 78 | 0 | 2.3 | 4825 | ○ | 11.4 | X |
| | 80 | 0.005 | 0.7 | 5943 | ○ | 4.8 | ○ |
| | 82 | 0.5 | 1.1 | 6345 | ○ | 6.7 | ○ |
| | 83 | 1 | 1.3 | 6652 | ○ | 5.9 | ○ |
| * | 85 | 1.5 | 2.6 | 14575 | X | 13.3 | X |

Sample marked "*" is out of the scope of the present invention.

TABLE 7

|   | No. | Total mean crystal grain size (μm) | Mean crystal grain size of aluminum oxide (μm) | Mean crystal grain size of titanium nitride (μm) | Flexural strength (MPa) | Mirror finishing property | Time to grind raw material (minute) | Conductivity |
|---|-----|------|------|------|-----|---|----|---|
| * | 100 | 1.2 | 0.4 | 0.9 | 440 | ○ | 10 | ○ |
|   | 101 | 1.2 | 0.5 | 0.9 | 510 | ○ | 10 | ○ |
|   | 102 | 1.2 | 0.6 | 0.9 | 530 | ○ | 10 | ○ |
|   | 103 | 1.2 | 1.4 | 0.9 | 700 | ○ | 10 | ○ |
|   | 104 | 1.2 | 2.1 | 0.9 | 650 | ○ | 10 | ○ |
|   | 105 | 1.2 | 2.2 | 0.9 | 600 | ○ | 10 | ○ |
| * | 106 | 1.2 | 2.3 | 0.9 | 440 | X | 10 | ○ |
| * | 107 | 1.2 | 1.4 | 0.1 | 600 | ○ | 30 | ○ |
|   | 108 | 1.2 | 1.4 | 0.2 | 600 | ○ | 10 | ○ |
|   | 109 | 1.2 | 1.4 | 0.3 | 650 | ○ | 10 | ○ |
|   | 110 | 1.2 | 1.4 | 0.9 | 700 | ○ | 10 | ○ |
|   | 111 | 1.2 | 1.4 | 1.5 | 530 | ○ | 10 | ○ |
|   | 112 | 1.2 | 1.4 | 1.6 | 510 | ○ | 10 | ○ |
| * | 113 | 1.2 | 1.4 | 1.7 | 440 | ○ | 10 | X |

Sample marked '*' is out of the scope of the present invention.

It is apparent from Table 7 that in Sample Nos. 100, 106 and 113 which are out of the scope of the present invention, flexural strength was rapidly lowered. In particular, Sample No. 106 had poor mirror finishing property, and Sample No. 113 had poor conductivity. Sample No. 107 out of the scope of the present invention took much longer time to grind raw materials. Moreover, the comparisons between Sample Nos. 102 and 104 and between Sample Nos. 109 and 111 made it clear that preferably, the mean crystal grain size of aluminum oxide was larger than that of titanium nitride to increase flexural strength.

In the samples of Examples 1 to 6, if not otherwise specified, the mean crystal grain size of titanium nitride was in the range of 20 to 95% to the mean crystal grain size of aluminum oxide.

What is claimed is:

1. An aluminum oxide-titanium nitride sintered body comprising 99% or greater main components by weight, the main components comprising of 65 to 85% by weight of aluminum oxide and titanium nitride constituting the rest, wherein a mean crystal grain size obtained by averaging the sum of the crystal grain sizes of the aluminum oxide and the titanium nitride is 0.4 to 2.0 μm;

the aluminum oxide has a mean crystal grain size of 0.5 to 2.2 μm; and the titanium nitride has a mean crystal grain size of 0.2 to 1.6 μm; and wherein other component other than said main component consists essentially of 0.005 to 1 parts by weight of at least one selected from ytterbium oxide and yttrium oxide to 100 parts by weight of the main component.

2. An aluminum oxide-titanium nitride sintered body comprising 83% or greater main components by weight, the main components comprising of 65 to 85% by weight of aluminum oxide and titanium nitride constituting the rest, wherein a mean crystal grain size obtained by averaging the sum of the crystal grain sizes of the aluminum oxide and the titanium nitride is 0.4 to 2.0 μm;

the aluminum oxide has a mean crystal grain size of 0.5 to 2.2 μm; and the titanium nitride has a mean crystal grain size of 0.2 to 1.6 μm; and wherein other component other than said main component consists essentially of, in total, 5 to 20 parts by weight of at least two selected from ytterbium oxide, yttrium oxide, magnesium oxide, zirconium oxide, titanium oxide, silicon oxide and calcium oxide to 100 parts by weight of the main component.

3. The aluminum oxide-titanium nitride sintered body according to claim 1 or 2, wherein volume resistivity is $10^{-3}$ Ω·cm or more to less than $10^6$ Ω·cm.

4. The aluminum oxide-titanium nitride sintered body according to claim 1 or 2, which has higher heat conductivity than 23 W/m·K.

5. The aluminum oxide-titanium nitride sintered body according to claim 1 or 2, which has a thermal expansion coefficient of 7.2 to 7.8 ppm/°C.

6. The aluminum oxide-titanium nitride sintered body according to claim 1 or 2, wherein the mean crystal grain size of aluminum oxide is larger than that of titanium nitride.

7. The aluminum oxide-titanium nitride sintered body according to claim 1 or 2, wherein the mean crystal grain size of titanium nitride is in the range of 20 to 95% to the mean crystal grain size of aluminum oxide.

8. A magnetic head substrate, comprising the aluminum oxide-titanium nitride sintered body according to claim 1 or 2.

* * * * *